(12) United States Patent
Kleckner

(10) Patent No.: US 6,807,635 B1
(45) Date of Patent: Oct. 19, 2004

(54) USING DIGITAL SIGNATURES TO VALIDATE TRADING AND STREAMLINE SETTLEMENT OF FINANCIAL TRANSACTION WORKFLOW

(75) Inventor: James E. Kleckner, Palo Alto, CA (US)

(73) Assignee: Currenex, Inc., Redwood City, CA (US)

( * ) Notice: Subject to any disclaimer, the term of this patent is extended or adjusted under 35 U.S.C. 154(b) by 690 days.

(21) Appl. No.: 09/712,763

(22) Filed: Nov. 13, 2000

(51) Int. Cl.⁷ .............................................. G06F 12/14
(52) U.S. Cl. ...................... 713/200; 380/228; 413/170; 413/176; 705/37
(58) Field of Search ................................. 713/170, 171, 713/175, 176, 177, 168; 705/51, 64, 67, 71, 75, 80, 77, 26, 37; 380/228

(56) References Cited

U.S. PATENT DOCUMENTS

| | | | | |
|---|---|---|---|---|
| 5,018,196 | A | | 5/1991 | Takaragi et al. ............... 380/30 |
| 6,061,789 | A | * | 5/2000 | Hauser et al. ............... 713/168 |
| 6,236,972 | B1 | * | 5/2001 | Shkedy ........................... 705/1 |
| 6,607,136 | B1 | * | 8/2003 | Atsmon et al. .............. 235/492 |

FOREIGN PATENT DOCUMENTS

WO     WO 00/28452     5/2000     ............ B06F/17/60

* cited by examiner

Primary Examiner—Pierre E. Elisca
(74) Attorney, Agent, or Firm—Park, Vaughan & Fleming LLP

(57) ABSTRACT

One embodiment of the present invention provides a system that uses digital signatures in a novel configuration to perform validations to facilitate a trade. This system operates by receiving a quote related to the trade at a first computer system, wherein the quote includes permission information that facilitates determining permissions that have been granted to a quote maker. Upon receiving the quote, the system validates that the quote maker digitally signed the quote by using a public key of the quote maker to verify that the quote was signed by a corresponding private key belonging to the quote maker. The system also validates that the quote maker has permission to perform the trade by using a public key of a first security officer to verify that the permission information was signed by a corresponding private key belonging to the first security officer, thereby authorizing the quote maker to perform the trade. The system accepts the quote by signing the quote with a private key belonging to a quote receiver, and communicating a trade record, including the signed quote, to the quote maker. In one embodiment of the present invention, the system additionally validates the identity of the quote maker by using a public key of a certification authority to verify that a certificate containing the public key of the quote maker was signed by a corresponding private key belonging to the certification authority. Note that signing by the certification authority indicates that the certification authority has verified the identity of the quote maker.

54 Claims, 8 Drawing Sheets

| FRONT OFFICE TRADER 310 | SETTLEMENT CLERK 311 | FRONT OFFICE TRADER 318 | SETTLEMENT CLERK 319 | TRADE RECORD 900 |
|---|---|---|---|---|
| 1 | 1 | 1 | 1 | TRADE DATE 902 |
| 1 | 1 | 1 | 1 | VALUE DATE 904 |
| 1 | 1 | 1 | 1 | CCY1 IDENTIFIER 906 |
| 1 | 1 | 1 | 1 | CCY1 AMOUNT 908 |
| 1 | 1 | 1 | 1 | CCY2 IDENTIFIER 910 |
| 1 | 1 | 1 | 1 | CCY2 AMOUNT 912 |
| - | - | - | - | CONVERSION RATE 914 |
| - | 1 | - | - | CCY1 ORGANIZATION 916 |
| - | 1 | - | - | CCY1 SUBSIDIARY 918 |
| - | - | - | 1 | CCY2 ORGANIZATION 920 |
| - | - | - | 1 | CCY2 SUBSIDIARY 922 |
| - | 1 | - | - | CCY1 ACCOUNT 924 |
| - | 1 | - | - | CCY1 CUSTODIAN 926 |
| - | - | - | 1 | CCY2 ACCOUNT 928 |
| - | - | - | 1 | CCY2 CUSTODIAN 930 |
| S | | | | CCY1 TRADE SIGNATURE 932 |
| | S | | | CCY1 SETTLEMENT SIGNATURE 934 |
| | | S | | CCY2 TRADE SIGNATURE 936 |
| | | | S | CCY2 SETTLEMENT SIGNATURE 938 |

| FRONT OFFICE TRADER 310 | SETTLE-MENT CLERK 311 | FRONT OFFICE TRADER 318 | SETTLE-MENT CLERK 319 | TRADE RECORD 900 |
|---|---|---|---|---|
| 1 | 1 | 1 | 1 | TRADE DATE 902 |
| 1 | 1 | 1 | 1 | VALUE DATE 904 |
| 1 | 1 | 1 | 1 | CCY1 IDENTIFIER 906 |
| 1 | 1 | 1 | 1 | CCY1 AMOUNT 908 |
| 1 | 1 | 1 | 1 | CCY2 IDENTIFIER 910 |
| 1 | 1 | 1 | 1 | CCY2 AMOUNT 912 |
| - | - | - | - | CONVERSION RATE 914 |
| - | 1 | - | - | CCY1 ORGANIZATION 916 |
| - | 1 | - | - | CCY1 SUBSIDIARY 918 |
| - | - | - | 1 | CCY2 ORGANIZATION 920 |
| - | - | - | 1 | CCY2 SUBSIDIARY 922 |
| - | 1 | - | - | CCY1 ACCOUNT 924 |
| - | 1 | - | - | CCY1 CUSTODIAN 926 |
| - | - | - | 1 | CCY2 ACCOUNT 928 |
| - | - | - | 1 | CCY2 CUSTODIAN 930 |
| S | | | | CCY1 TRADE SIGNATURE 932 |
| | S | | | CCY1 SETTLEMENT SIGNATURE 934 |
| | | S | | CCY2 TRADE SIGNATURE 936 |
| | | | S | CCY2 SETTLEMENT SIGNATURE 938 |

FIG. 9

USING DIGITAL SIGNATURES TO VALIDATE TRADING AND STREAMLINE SETTLEMENT OF FINANCIAL TRANSACTION WORKFLOW

BACKGROUND

1. Field of the Invention

The present invention relates to computer-based systems for trading financial instruments. More specifically, the present invention relates to a method and an apparatus that uses digital signatures in validating trading and settlement operations involved in a financial transaction, such as a foreign exchange transaction.

2. Related Art

The foreign exchange market is the largest and most liquid market in the world. In 1998, the Federal Reserve Bank of New York estimated, that daily turnover was approximately $1.5 trillion.

Unlike stocks, which are market-traded, foreign exchange is primarily an over-the-counter market. There is no such thing as a "price" for a particular transaction. Rather, each dealer, bank, broker, or other trading source, provides their own rate for each transaction.

The trading and settlement processes for a typical foreign exchange transaction are illustrated in FIG. 1. A trader 102, working on behalf of a corporation or other entity, makes a quote request 106 to a trader 104, working on behalf of a bank. In response to this quote request, trader 104 makes a quote 108 proposing a rate for the transaction.

Trader 102 accepts the quote by sending an acceptance message to trader 104, in which case trader 104 typically sends an acknowledgement message 112 back to trader 102.

Note that the communication process outlined above typically takes place over the telephone or via facsimile.

After traders 102 and 104 agree to the terms of the transaction, trader 102 communicates trade information to settlement clerk 118, who works on behalf of the same organization as trader 102. Similarly, trader 104 communicates trade information 116 to settlement clerk 120, who works on behalf of the same organization as trader 104.

Settlement clerks 118 and 120 are responsible for actually causing funds to be transferred between accounts of the two organizations involved in the trade. Before doing so, settlement clerks 118 and 120 communicate and confirm settlement information 122 with each other. This settlement information 122 confirms the terms of the trade, and additionally specifies the accounts between which funds are to be transferred.

Note that settlement clerks 118 and 120 typically communicate settlement information 122 via telephone or facsimile. In some cases, this settlement information is communicated through a third party payment matching system 128.

After the settlement information is communicated, and if the terms of the deal are in agreement, settlement clerk 118 communicates with funds transfer agent 126, who actually transfers the funds. Similarly, settlement clerk 120 communicates with funds transfer agent 124 to transfer funds in the reverse direction.

Note that the separation of roles between trading and settlement provides a measure of protection against fraud because collusion between a trader and a settlement clerk is required to perpetrate most types of fraud. However, this protection has a price, because the many manual communications, validations, and confirmations involved in the role-based trading and settlement processes are time-consuming and expensive.

Also note that the trade terms and settlement instructions are typically entered manually on both sides of the transaction. Consequently, the trade terms and settlement instructions are often not entered in the same way, and may not match. Even if the trade terms and settlement instructions are entered properly, netting and aggregation can cause trades not to match. If trades do not match, a great amount of additional work is required to sort out inconsistencies.

What is needed is a method and an apparatus for facilitating trading and settlement of financial instruments, such as currencies, without the time-consuming manual processes involved in existing trading, settlement, and confirmation processes.

SUMMARY

One embodiment of the present invention provides a system that uses digital signatures in performing validations to facilitate a trade. This system operates by receiving a quote related to the trade at a first computer system, wherein the quote includes signed permission information that facilitates verifying permissions that have been granted to a quote maker. Upon receiving the quote, the system validates that the quote maker digitally signed the quote by using a public key of the quote maker to verify that the quote was signed by a corresponding private key belonging to the quote maker. The system also validates that the quote maker has permission to perform the trade by using a public key of a first security officer to verify that the permission information was signed by a corresponding private key belonging to the first security officer, thereby authorizing the quote maker to perform the trade. The system records acceptance of the quote by signing appropriate fields of the quote with a private key belonging to a quote receiver, and communicating a trade record, including the signed quote, to the quote maker.

In one embodiment of the present invention, the system additionally validates the identity of the quote maker and quote receiver by using a public key of a certification authority to verify that a certificate containing the public key of the quote maker or quote receiver was signed by a corresponding private key belonging to the certification authority. Note that signing by the certification authority indicates that the certification authority has verified the identity of the quote maker and quote receiver.

In one embodiment of the present invention, the quote includes multiple quotes from multiple quote makers, which have been aggregated into by a trade facilitator.

In one embodiment of the present invention, communicating the trade record to the quote maker involves sending the trade record to the trade facilitator, who forwards the trade record to the quote maker.

In one embodiment of the present invention, prior to receiving the quote at the first computer system, the system communicates a quote request from the quote receiver to the quote maker. This quote request includes information that allows the quote maker to validate the identity of the quote receiver. It also includes information that allows the quote maker to validate that the quote receiver has permission to perform the trade by using a public key of a second security officer associated with the quote receiver to verify that permission information within the quote request was signed by a corresponding private key belonging to the second security officer, thereby authorizing the quote receiver to perform the trade.

In one embodiment of the present invention, in accepting the quote, the system additionally sends the trade record to a settlement clerk associated with the quote receiver who is responsible for settling the trade.

In one embodiment of the present invention, prior to receiving the quote, the system allows the quote maker to obtain permission to make the trade. The quote maker does so by sending a request for permission to the first security officer associated with the quote maker. This allows the first security officer to digitally sign a permission record to indicate the quote maker has permission to trade.

In one embodiment of the present invention, the trade involves foreign exchange and the trade record includes: a trade date, an identifier for a first currency, a first currency amount, an identifier for a first organization providing the first currency, an identifier for a second currency, a second currency amount, and an identifier for a second organization providing the second currency.

One embodiment of the present invention provides a system that uses digital signatures in performing validations to facilitate a trade. This system operates by receiving a trade record from a quote receiver who has accepted a quote and has thereby created the trade. This trade record is received by a first settlement clerk associated with the quote receiver, who is responsible for settling the trade. Next, the system augments the trade record with settlement instructions identifying at least one account to be used in settling the trade, and then signs the relevant fields of the trade record with a private key belonging to the first settlement clerk. The system then communicates the trade record to a second settlement clerk associated with a quote maker.

In one embodiment of the present invention, upon receiving the trade record at the second settlement clerk, the system uses a public key belonging to the first settlement clerk to validate that the first settlement clerk has signed the relevant fields of the trade record. The system also validates that the first settlement clerk has been granted permission to settle the trade by examining permission information contained within the trade record to verify that a first security officer associated with the first settlement clerk has digitally signed the permission information, thereby authorizing the first settlement clerk to settle the trade. Next, the system communicates the trade to a funds transfer agent to carry out the trade.

In one embodiment of the present invention, communicating the trade record to the second settlement clerk involves sending the trade record to a trade facilitator. This trade facilitator augments the trade record with the permission information for the first settlement clerk, and then forwards the trade record to the second settlement clerk.

In one embodiment of the present invention, the settlement instructions include: an identifier for a first account belonging to the first organization; and an identifier for a second account belonging to the second organization.

One embodiment of the present invention provides a system that uses digital signatures in performing validations to facilitate a trade. This system operates by receiving a quote request from a quote requester at a computer system belonging to a trade facilitator. Next, the system looks up a trading permission for the quote requester from a database maintained by the trade facilitator, and appends the trading permission to the quote request to form a trade record. Next, the system communicates the trade record to potential quoting entities.

Upon receiving quotes from the potential quoting entities, the system augments the trade record to include the quotes, and then sends the augmented trade record to the quote requester.

In one embodiment of the present invention, the system additionally receives a selection of a quote from the quote requester, and notifies each of the quoting entities about whether the quote they made was selected.

In one embodiment of the present invention, the system receives a trade record from a first settlement clerk associated with the quote requester. This record includes settlement instructions appended to the trade record by the first settlement clerk. Upon receiving the trade record, the system looks up permission information for the first settlement clerk in a database, and then augments the trade record with the permission information for the first settlement clerk. Next, the system forwards the trade record to a second settlement clerk associated with a quote maker. This allows the second settlement clerk to validate the permission information by verifying that the permission information was signed with a private key belonging to a first security officer associated with the first settlement clerk, thereby authorizing the first settlement clerk to settle the trade.

Note that in the case that all permissions and signatures are valid, the first and second settlement clerks may be reliably replaced by automated processes, reserving human intervention for the exceptional cases.

BRIEF DESCRIPTION OF THE FIGURES

FIG. 9 illustrates the structure of a trade record in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Exchange System

Figure 1:
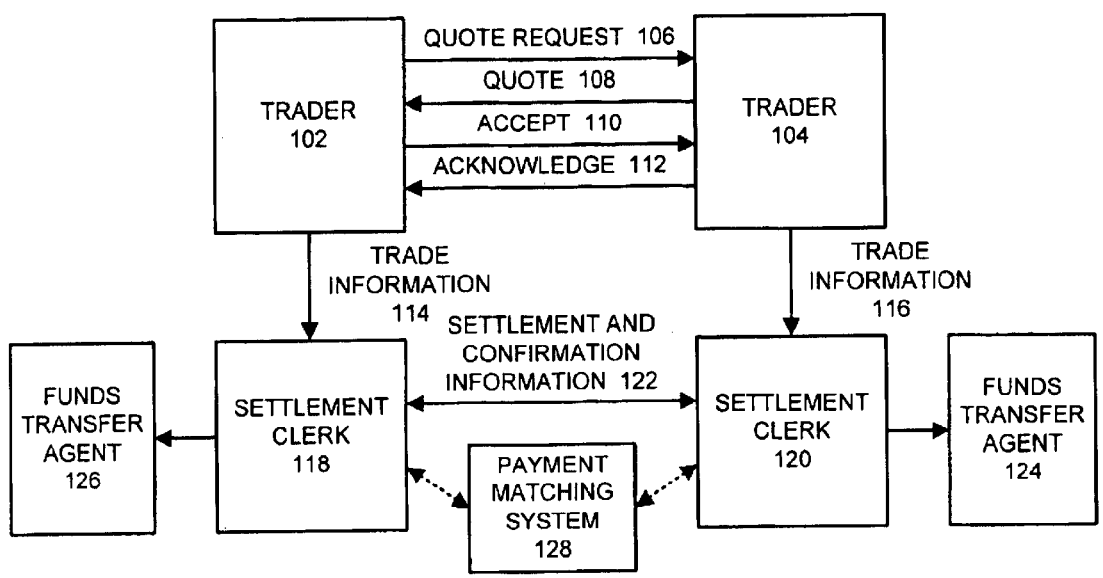
FIG. 1 is a prior art that illustrates typical trading and settlement processes.
Figure 2:
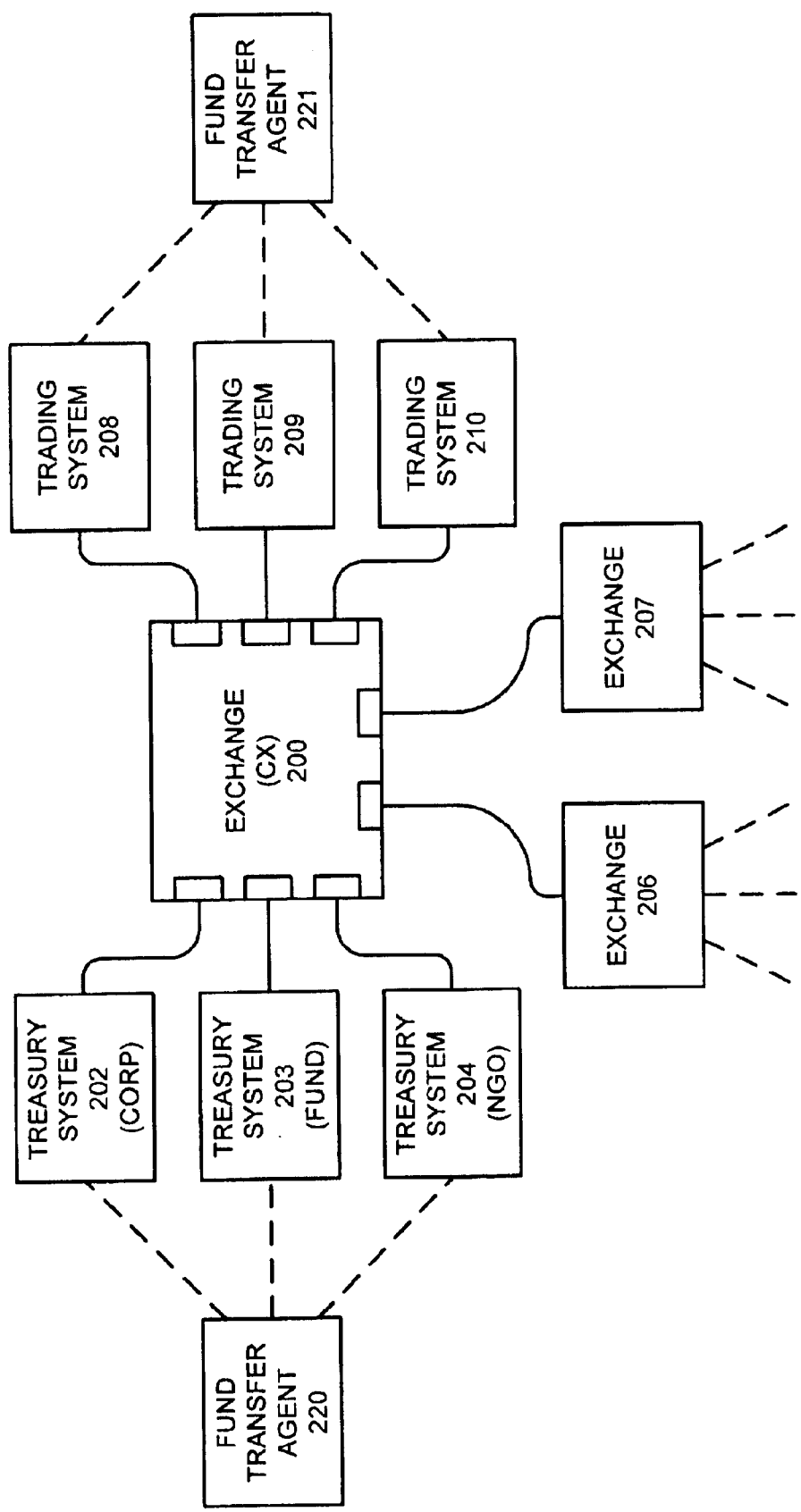
FIG. 2 illustrates an exchange that facilitates automated trading and settlement in accordance with an embodiment of the present invention.

FIG. 2 illustrates an exchange 200 that facilitates automated trading and settlement in accordance with an embodiment of the present invention. Exchange 200 facilitates trades between treasury systems 202–204 and trading systems 208–210. Exchange 200 can additionally be coupled to a number of other exchanges 206–207. Note that exchange 200, treasury systems 202–204 and trading systems 208–210 run on computer systems. These computer systems can generally include any type of computer system, including, but not limited to, a computer system based on a microprocessor, a mainframe computer, a digital signal processor, a portable computing device, a personal organizer, a device controller, and a computational engine within an appliance.

Also note that linkages show in FIG. 2 pass across one or more computer networks (not shown). These networks generally include any type of wire or wireless communication channel capable of coupling together computing nodes. This includes, but is not limited to, a local area network, a wide area network, or a combination of networks. In one embodiment of the present invention, the network includes the Internet.

Treasury systems 202–204 generally belong to organizations requiring foreign exchange services, such as corporations, funds or non-governmental organizations (NGOs) but could also include banks requesting trades. Hence, treasury systems 202–204 generally request quotes for from trading systems 208–210, and accept quotes from trading systems 208–210.

Trading systems 208–210 generally belong to banks providing foreign exchange services but could include other organizations that choose to act as quote makers. Hence, trading systems 208–210 generally receive quote requests from treasury systems 202–204, and make quotes to be accepted by treasury systems 202–204.

Treasury systems 202–204 are coupled to one or more funds transfer agents, such as funds transfer agent 220, which carry out instructions to actually transfer funds between accounts. Similarly, trading systems 208–210 are coupled to one or more funds transfer agents, such as funds transfer agent 221. Note that funds transfer agents 220 and 221 may be the same funds transfer agent.

Exchange 200 communicates secure, authenticated quote requests, quotes and quote acceptances between treasury systems 202–204 and trading systems 208–210. Exchange 200 also facilitates communication of settlement instructions between treasury systems 202–204 and trading systems 208–210. These functions are described in more detail with reference to FIGS. 3–9 below.

Note that exchange 200 can additionally be coupled to exchanges 206–207 to facilitate cross-exchange transactions.

Granting of Credentials and Permissions

Figure 3:
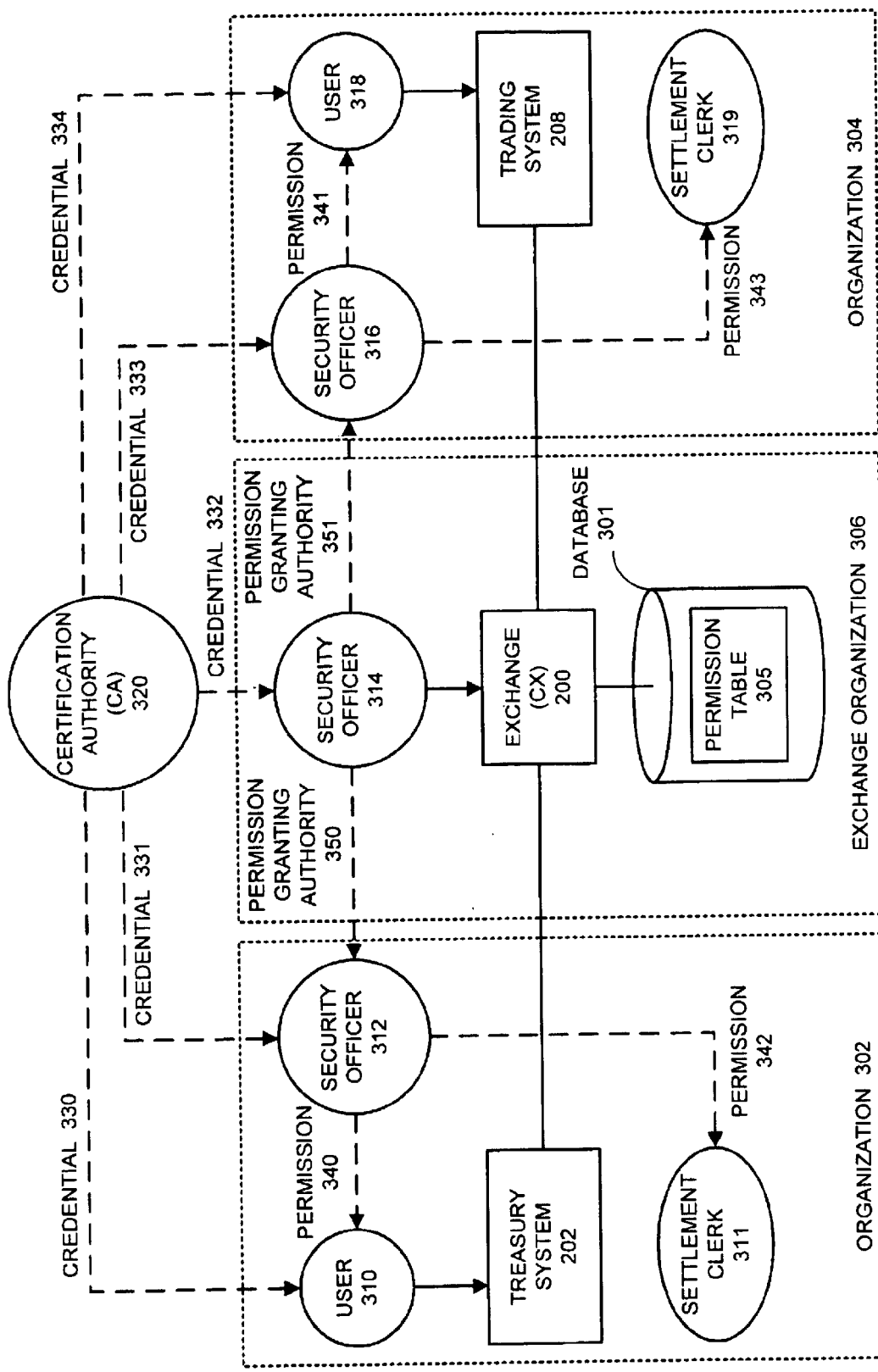
FIG. 3 illustrates how credentials and permissions are granted in accordance with an embodiment of the present invention.

FIG. 3 illustrates how credentials and permissions are granted in accordance with an embodiment of the present invention. In FIG. 3, organization 302 trades with organization 304 through exchange 200. Certification authority 320 is an independent entity that verifies the identity of users and grants credentials for use by various actors belonging to organizations 302–304 and to exchange organization 306.

More specifically, organization 302 includes treasury system 202, which communicates with exchange 200. Treasury system 202 operates under control of user 310, such as a front office trader, who receives permissions from a local security officer 312, who also is associated with organization 302. Organization 302 also includes a settlement clerk 311, who is responsible for settling trades made by user 310.

Similarly, organization 304 includes trading system 208, which communicates with exchange 200. Trading system 208 operates under control of user 318, who receives permissions from a local security officer 316, who is also associated with organization 304. Organization 304 also includes a settlement clerk 319, who is responsible for settling trades made by user 318.

Exchange organization 306 includes exchange 200 as well as security officer 314, who confers permission granting authority to local security officers 312 and 316. Note that exchange 200 is coupled to a database 301, which contains permission table 305. Permission table 305 contains permissions for users 310 and 318, security officers 312 and 316, and settlement clerks 311 and 319.

All of the above-described entities receive credentials from independent certification authority (CA) 320, which grants credentials to users 310 and 318, security officers 312, 314 and 316, and settlement clerks 311 and 319. This credential granting process is described below with reference to FIG. 4.

During operation of the system illustrated in FIG. 3, CA 320 generates credentials 330–334 that are used by actors, such users 310 and 318, security officers 312, 314 and 316 and settlement clerks 311 and 319 to validate identities.

In addition to validating identities, the system illustrated in FIG. 3 validates permissions to perform operations, such as trading and settling trades. Security officer 314, who belongs to exchange organization 306, confers permission granting authority on security officers 312 and 316 belonging to organizations 302 and 304, respectively. Security officers 312 and 316 in turn grant trading permissions 340 and 341 to users 310 and 318, respectively. Security officers 312 and 316 can also grant settlement permissions 342 and 343 to settlement clerks 311 and 319, respectively. Note that users 310 and 318 require both permissions and credentials in order to perform actions, such as trading and settling trades.

Process of Obtaining a Credential

Figure 4:
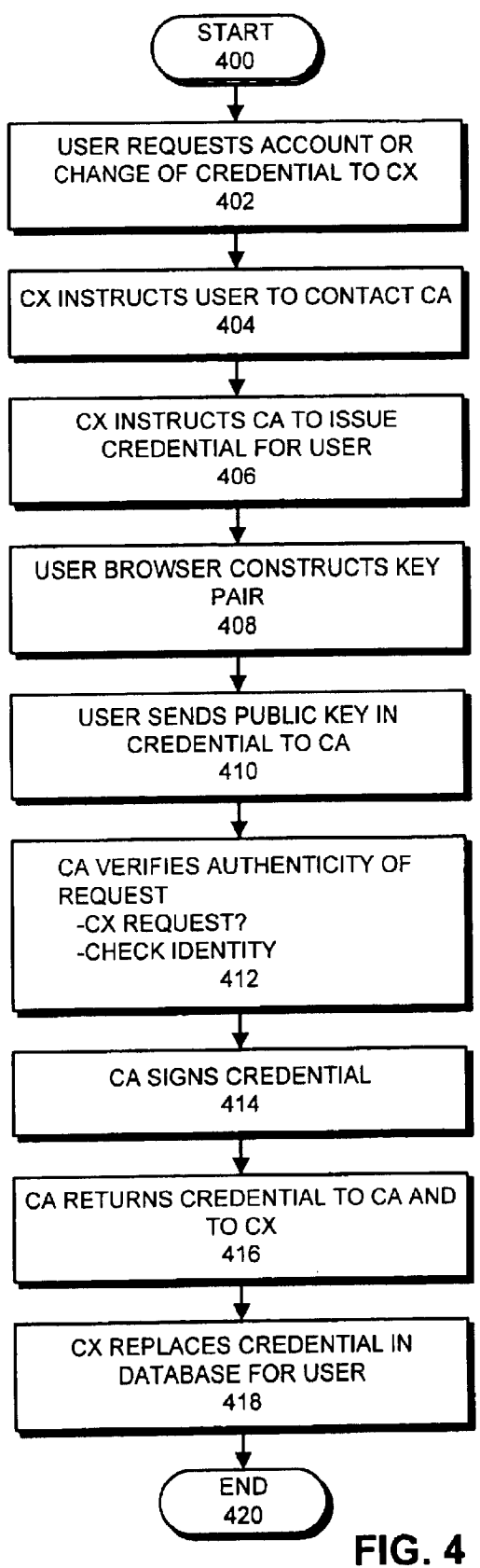
FIG. 4 is a flow chart illustrating the process of obtaining a credential from a certification authority in accordance with an embodiment of the present invention.

FIG. 4 is a flow chart illustrating the process of obtaining a credential 330 from a certification authority 320 for a user 310 in accordance with an embodiment of the present invention. The process starts when user 310 requests a credential 330 from currency exchange (CX) 200 (step 402). (Note that this credential is also referred to as a digital certificate.) In response to the request, CX 200 instructs user 310 to contact CA 320 (step 404). CX 200 additionally instructs CA 320 to issue a credential for user 310 (step 406).

Next, user 310 (or a browser for user 310) constructs a public key/private key pair (step 408), and then sends the newly created public key along with a request for a credential to CA 320 (step 410).

CA 320 then verifies the authenticity of the request (step 412). This process involves determining if CX 200 has instructed CA 320 to issue the credential 330. It also involves performing some type of manual or automated identity check on user 310. For example, the check can involve a database lookup of information on user 310, an interview with user 310, a telephone call to user 310 or a facsimile communication with user 310.

If the request is properly verified, CA 320 signs credential 330 with a private key belonging to CA 320 (step 414), and returns credential 330 to user 310 and to CX 200 (step 416). CX 200 then places the new credential 330 for user 310 in its database 301 (step 418). Note that credential 330 is signed by CA 320 and includes a public key for user 310.

Also note that it is desirable to make CX 200 and CA 320 independent of each other. This makes perpetrating a fraud during the trading and/or settlement processes harder, because such fraud requires collusion between CX 200 and CA 320.

Process of Obtaining Authority to Grant Permissions

Figure 5:
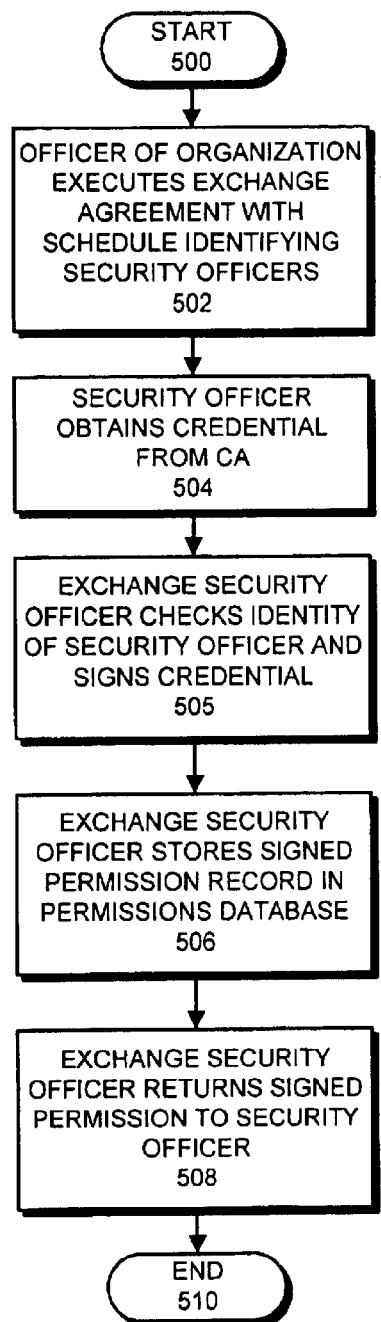
FIG. 5 is a flow chart illustrating how a security officer obtains authority to grant permissions in accordance with an embodiment of the present invention.

FIG. 5 is a flow chart illustrating how a security officer 312 obtains authority to grant permissions in accordance with an embodiment of the present invention. The process starts when an officer of a member organization of exchange 200, such as the CEO of organization 302, executes an exchange agreement with exchange 200 (step 502). This exchange agreement includes a schedule identifying security officers within organization 302 who are to be granted authority to confer permissions upon users belonging to organization 302.

Next, security officer 312 within organization 302 obtains a credential 331 from CA 320 through the process outlined in FIG. 4 above (step 504). Security officer 312 then communicates credential 331 to security officer 314, who belongs to exchange organization 306. Next, security officer 314 checks the identity of security officer 312 through telephone calls, facsimile communications or other means.

If the identity or security officer 312 is confirmed to be one of the listed security officers in the schedule of step 502, security officer 314 enables the security officer permission in the permissions table of the database by signing the database record 331 through the process described below in FIG. 6 with a private key belonging to security officer 314. At this point, security officer 312 is authorized by both CA 320 and security officer 314.

Security officer 314 then stores the signed permission record 331 in database 301 within exchange organization 306 (step 506). Security officer 314 also returns the signed credential 331 to security officer 312 (step 508).

Process of Obtaining a Permission

Figure 6:
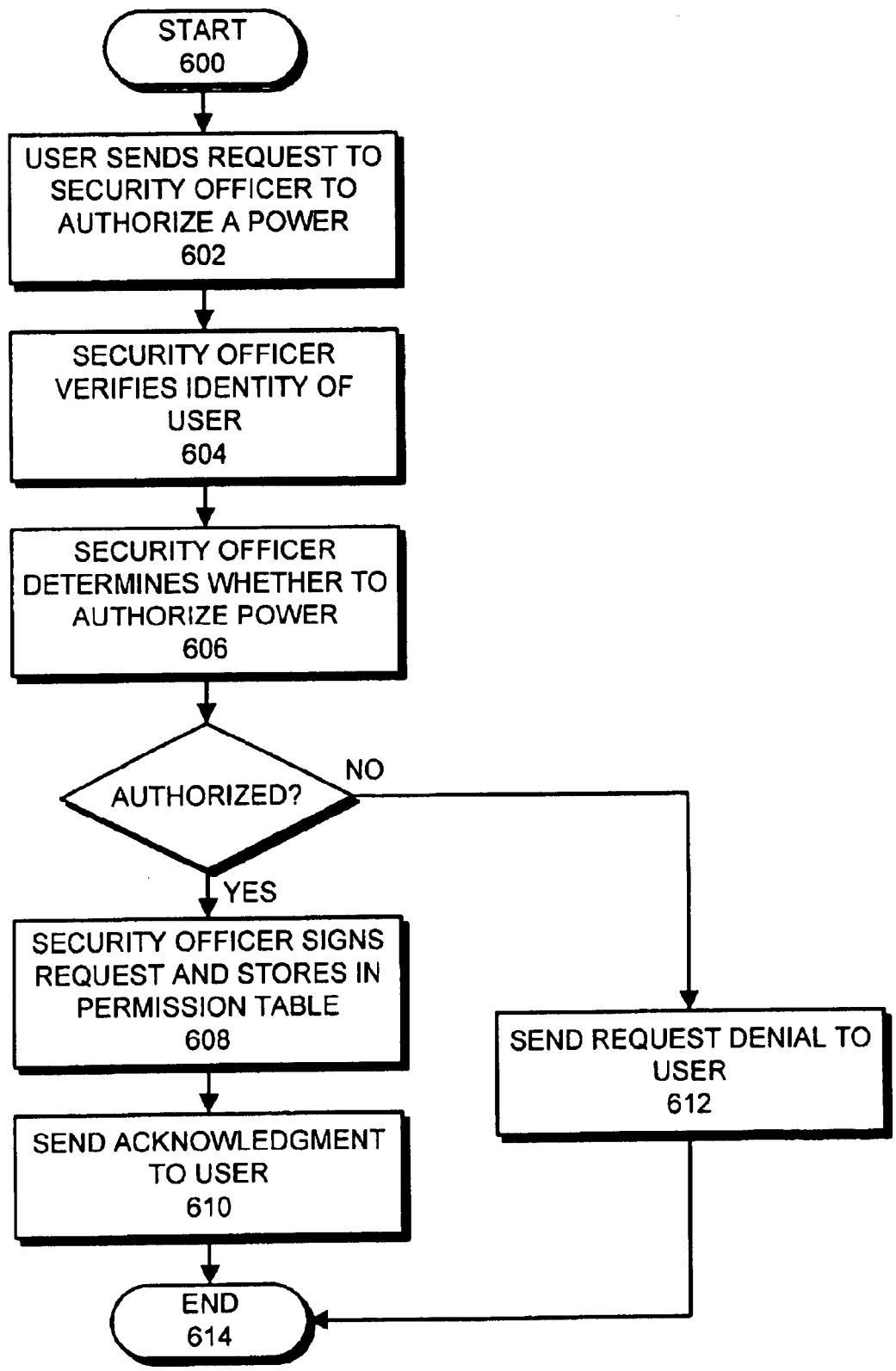
FIG. 6 is a flow chart illustrating the process of obtaining a permission from a security officer in accordance with an embodiment of the present invention.

FIG. 6 is a flow chart illustrating the process of obtaining a permission 340 from a security officer 312 for a user 310 in accordance with an embodiment of the present invention. User 310 first sends a request to security officer 312 to obtain a permission, such as the permission to trade (step 602). Note that this request includes credential 330 for user 310.

Security officer 312 then validates the identity of user 310 by examining credential 330 (step 604). If the identity validates, security officer 312 determines whether to grant the permission based upon a rule or some other process defined by organization 302 (step 606).

If the permission is to be granted, security officer 312 signs the request with a private key belonging to security officer 312, and then stores the request within permission table 305 (step 608). Security officer 312 then sends an acknowledgement to user 310 to complete the process (step 610).

If the permission is not to be granted, security officer 312 sends a request denial to user 310 (step 612).

Note that permission table 305 contains a row (entry) for each user. This row contains a number of separately signed fields indicating various permissions. For example, a given entry for user 310 may include a unique string identifying a permission (for example, the name of the permission), as well as the public key of user 310, all of which is signed with the private key of security officer 312.

Process of Facilitating a Trade

Figure 7:
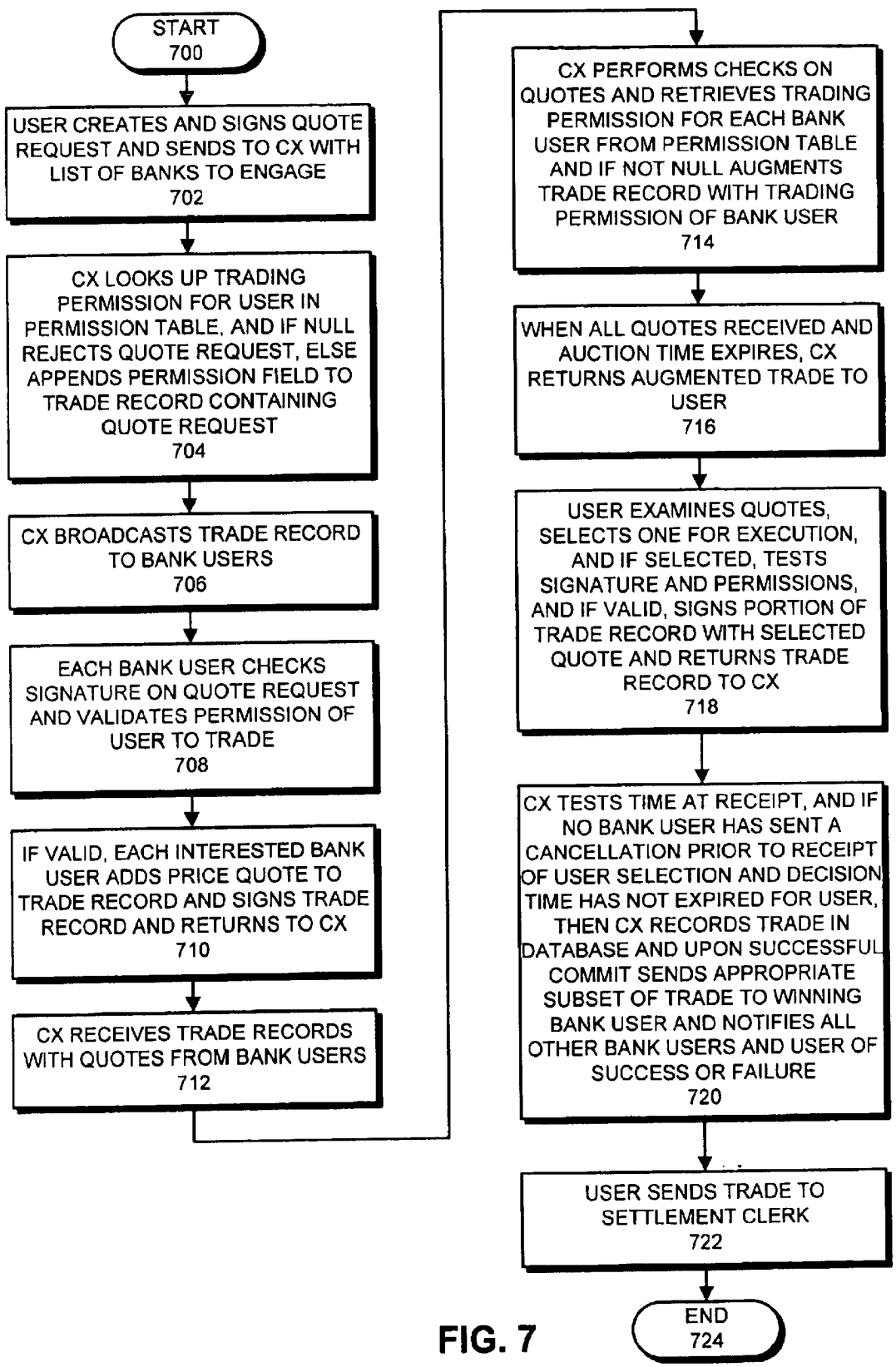
FIG. 7 is a flow chart illustrating the process of facilitating a trade in accordance with an embodiment of the present invention.

FIG. 7 is a flow chart illustrating the process of facilitating a trade in accordance with an embodiment of the present invention. This process starts when a user 310 creates and digitally signs a quote request, and sends the quote request to CX 200 (step 702). Note that this quote request can include a list of banks to engage.

Also note that the term "digitally signing" refers to the process of signing a message with a private key belonging to a first entity so that other entities can use a public key belonging to the first entity to verify that the message was signed with the private key belonging to the first entity.

Upon receiving the quote request, CX 200 looks up the trading permission for user 310 in permission table 305. If the entry in permission table 305 is null (empty), CX 200 rejects the quote request. Otherwise, CX 200 appends the permission for user 310 to a trade record containing the quote request (step 704). CX 200 then broadcasts the trade record to the specified bank users (step 706).

Each bank user 318 who receives the trade record checks the signature on the quote request to validate the identity of user 310, and also checks permission information in the trade record to verify that user 310 has permission to perform the trade (step 708).

If the identity and permission are valid, each interested bank user 318 adds a price quote to the trade record, signs the trade record, and returns the trade record to CX 200 (step 710).

Next, CX 200 receives trade records with quotes from interested bank users (step 712). CX 200 then performs checks on the quotes and retrieves trading permissions for each interested bank user from permission table 305. If these trading permissions are not null, CX 200 appends the permissions to the trade record (step 714).

When all quotes have been received and the auction time expires, CX 200 returns the augmented trade record to user 310 (step 716). Note that although the present example is presented in the context of a reverse competitive auction, the present invention can generally be applied to trading and settling systems that use any type of pricing mechanism, and is not limited to reverse competitive auctions.

Next, user 310 examines all of the quotes in the trade record, and selects one for execution. If a quote is selected, user 310 tests the signature and permissions of the quote. If these are valid, user 310 signs the portion of the trade record with the selected quote, and returns the trade record to CX 200 (step 718).

Upon receiving the trade record, CX 200 tests the time of receipt. If no bank user has sent a cancellation prior to receipt of the user selection, and if the decision time has not expired for user 310, CX 200 records the trade in database 301. Upon successful commit, CX 200 sends the appropriate subset of the trade to the winning bank user, and informs all other bank users and user 310 of success or failure (step 720).

Next, bank user 310 sends the trade record to settlement clerk 311 within the same organization 302 to settle the trade (step 722).

Process of Settling a Trade

Figure 8:
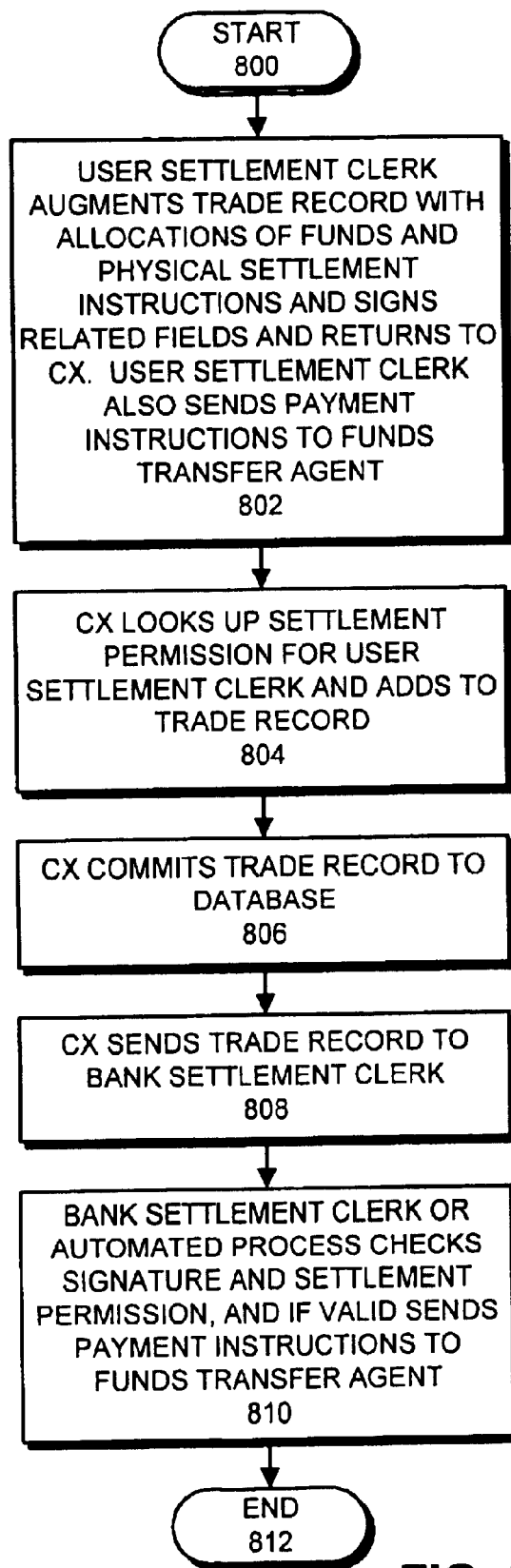
FIG. 8 is a flow chart illustrating the process of settling a trade in accordance with an embodiment of the present invention.

FIG. 8 is a flow chart illustrating the process of setting a trade in accordance with an embodiment of the present invention. The process starts when settlement clerk 311 augments the trade record with allocations of funds and physical settlement instructions. Settlement clerk 311 then signs the related fields of the trade record and forwards the trade record to CX 200 (step 802). Note that if the settlement instructions are default (standing) instructions, settlement clerk 311 may not have to append additional settlement instructions to the trade record. Settlement clerk 311 also sends payment instructions to funds transfer agent 220.

Upon receiving the trade record, CX 200 looks up the settlement permission for settlement clerk 311. If this permission is not null, CX 200 adds the permission to the trade record (step 804). CX 200 then commits the trade record to database 301 (step 806), and sends the trade record to bank settlement clerk 319 (step 808).

Upon receiving the trade record, bank settlement clerk 319 checks the signature and settlement permission of settlement clerk 311, and possibly checks other signatures and permissions in the trade record. If all are valid, settlement clerk 319 sends instructions to funds transfer agent 221 to complete the trade (step 810).

Trade Record Structure

FIG. 9 illustrates the structure portions of a trade record 900 in accordance with an embodiment of the present invention to trade Spot Foreign Currency Exchange (FX). Trade record 900 includes a number of fields, some of which are illustrated in FIG. 9. These fields include trade date 902, which identifies the date the trade took place, and value date 904 which identifies the date the currency is to be exchanged.

Currency 1 (CCY1) identifier 906 identifies a first currency involved in the trade (such as US Dollars). CCY1 amount 908 specifies an amount of the first currency involved in the trade. CCY2 identifier 910 identifies a second currency involved in the trade (such as Japanese Yen). CCY2 amount 912 specifies an amount of the second currency involved in the trade. Conversion rate 914 specifies a conversion rate between the first currency and the second currency.

CCY1 organization 916 identifies a first organization involved in the trade, and CCY1 subsidiary 918 identifies a specific subsidiary of the first organization that is involved in the trade. CCY2 organization 920 identifies a second organization involved in the trade, and CCY2 subsidiary 922 identifies a specific subsidiary of the second organization that is involved in the trade.

CCY1 account 924 identifies and account for the first organization, and CCY1 custodian 926 identifies an institution (bank) maintaining the account for the first organization. CCY2 account 928 identifies and account for the second organization, and CCY2 custodian 930 identifies an institution maintaining the account for the second organization.

There are also trading and settlement signatures for currency one, 932 and 934, as well as trading and settlement signatures for currency two, 936 and 938.

Note that certain portions of trade record 900 are signed by a user, such as front office trader 310, and other portions are signed by a settlement clerk, such as settlement clerk 311. In particular, front office trader 310 signs portions of trade record 900 that include trade parameters. Settlement clerk 311 signs these as well as the portions of trade record 900 that contain settlement instructions, such as account identifiers. (The "1" values in FIG. 9 indicate which portions of the trade record are signed by respective entities, and the "S" values indicate the respective digital signatures.)

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using digital signatures in performing validations to facilitate a trade, comprising:

receiving a quote related to the trade at a first computer system;

wherein the quote includes permission information that facilitates determining permissions that have been granted to a quote maker who is making the quote;

validating that the quote maker digitally signed the quote by using a public key of the quote maker to verify that the quote was signed by a corresponding private key belonging to the quote maker;

validating that the quote maker has permission to perform the trade by using a public key of a first security officer to verify that the permission information was signed by a corresponding private key belonging to the first security officer, thereby authorizing the quote maker to perform the trade;

if the quote is to be accepted, accepting the quote by,
  signing the quote with a private key belonging to a quote receiver, and
  communicating a trade record including the signed quote to the quote maker;

wherein the quote maker and the first security officer are separate entities;

whereby requiring signatures from both the quote maker and the first security officer prevents perpetration of fraud by a single entity.

2. The method of claim 1, further comprising validating the identity of the quote maker by using a public key of a certification authority to verify that a certificate containing the public key of the quote maker was signed by a corresponding private key belonging to the certification authority, wherein the signing by the certification authority indicates that the certification authority has verified the identity of the quote maker.

3. The method of claim 2, wherein the quote includes multiple quotes from multiple quote makers, and wherein the multiple quotes have been aggregated by a trade facilitator.

4. The method of claim 3, wherein communicating the trade record to the quote maker involves:

sending the trade record to the trade facilitator; and allowing the trade facilitator to send the trade record to the quote maker.

5. The method of claim 1, further comprising:

prior to receiving the quote at the first computer system, communicating a quote request from the quote receiver on the first computer system to the quote maker;

allowing the quote maker to validate the identity of the quote receiver;

allowing the quote maker to validate that the quote receiver has permission to perform the trade by using a public key of a second security officer associated with the quote receiver to verify that permission information within the quote request was signed by a corresponding private key belonging to the second security officer, thereby authorizing the quote receiver to perform the trade.

6. The method of claim 1, wherein accepting the quote further comprises sending the trade record to a settlement clerk associated with the quote receiver who is responsible for settling the trade.

7. The method of claim 1, wherein prior to receiving the quote the method further comprises, allowing the quote maker to obtain permission to make the trade by:
   sending a request for permission to the first security officer associated with the quote maker;
   allowing the first security officer to digitally sign a permission record to indicate the quote maker has permission to trade.

8. The method of claim 1, wherein the trade involves foreign exchange and wherein the trade record includes:
   a trade date;
   an identifier for a first currency;
   a first currency amount;
   an identifier for a first organization providing the first currency;
   an identifier for a second currency;
   a second currency amount; and
   an identifier for a second organization providing the second currency.

9. A method for using digital signatures in performing validations to facilitate a trade, comprising:
   receiving a trade record from a quote receiver who has accepted a quote and has thereby created the trade, wherein the trade record is signed by the quote receiver;
   wherein the trade record is received by a first settlement clerk associated with the quote receiver, who is responsible for settling the trade;
   augmenting the trade record with settlement instructions identifying at least one account to be used in settling the trade;
   signing the trade record with a private key belonging to the first settlement clerk;
   communicating the trade record to a second settlement clerk associated with a quote maker;
   wherein the quote receiver and the first settlement clerk are separate entities;
   whereby requiring signatures from both the quote receiver and the first settlement clerk prevents perpetration of fraud by a single entity.

10. The method of claim 9, further comprising:
    receiving the trade record at the second settlement clerk;
    using a public key belonging to the first settlement clerk to validate that the first settlement clerk has signed to trade record;
    validating that the first settlement clerk has been granted permission to settle the trade by examining permission information contained within the trade record to verify that a first security officer associated with the first settlement clerk has digitally signed the permission information in order to authorize the first settlement clerk to settle the trade; and
    communicating the trade to a funds transfer agent to carry out the trade.

11. The method of claim 10, wherein communicating the trade record to the second settlement clerk involves:
    sending the trade record to a trade facilitator;
    allowing the trade facilitator to augment the trade record with the permission information for the first settlement clerk; and
    allowing the trade facilitator to forward the trade record to the second settlement clerk.

12. The method of claim 9, wherein the trade involves foreign exchange and wherein the trade record includes:
    a trade date;
    an identifier for a first currency;
    a first currency amount;
    an identifier for a first organization providing the first currency;
    an identifier for a second currency;
    a second currency amount; and
    an identifier for a second organization providing the second currency.

13. The method of claim 12, wherein the settlement instructions include:
    an identifier for a first account belonging to the first organization; and
    an identifier for a second account belonging to the second organization.

14. A method for using digital signatures in performing validations to facilitate a trade, comprising:
    receiving a quote request from a quote requester at a computer system belonging to a trade facilitator, wherein the quote request has been signed by a quote requester and a first security officer;
    looking up a trading permission for the quote requester from a database maintained by the trade facilitator;
    appending the trading permission to the quote request to form a trade record;
    communicating the trade record to potential quoting entities;
    receiving quotes from the potential quoting entities;
    augmenting the trade record to include the quotes; and
    sending the augmented trade record to the quote requester;
    wherein the quote requestor and the first security officer are separate entities;
    whereby requiring signatures from both the quote requester and the first security officer prevents perpetration of fraud by a single entity.

15. The method of claim 14, further comprising:
    receiving a selection of a quote from the quote requester; and
    notifying each of the quoting entities about whether the quote they made was selected.

16. The method of claim 15, further comprising:
    receiving the trade record from a first settlement clerk associated with the quote requester;
    wherein the trade record includes settlement instructions appended to the trade record by the first settlement clerk;
    looking up permission information for the first settlement clerk in a database;
    augmenting the trade record with the permission information for the first settlement clerk; and
    forwarding the trade record to a second settlement clerk associated with a quote maker;
    whereby the second settlement clerk can validate the permission information by verifying that the permission information was signed with a private key belonging to a first security officer associated with the first settlement clerk, thereby authorizing the first settlement clerk to settle the trade.

17. The method of claim 16, wherein the trade involves foreign exchange and wherein the trade record includes:
    a trade date;
    an identifier for a first currency;
    a first currency amount;
    an identifier for a first organization providing the first currency;
    an identifier for a second currency;
    a second currency amount; and
    an identifier for a second organization providing the second currency.

18. The method of claim 17, wherein the settlement instructions include:
    an identifier for a first account belonging to the first organization; and
    an identifier for a second account belonging to the second organization.

19. A computer-readable storage medium storing instructions that when executed by a computer cause the computer to perform a method for using digital signatures in performing validations to facilitate a trade, the method comprising:
    receiving a quote related to the trade at a first computer system;
    wherein the quote includes permission information that facilitates determining permissions that have been granted to a quote maker who is making the quote;
    validating that the quote maker digitally signed the quote by using a public key of the quote maker to verify that the quote was signed by a corresponding private key belonging to the quote maker;
    validating that the quote maker has permission to perform the trade by using a public key of a first security officer to verify that the permission information was signed by a corresponding private key belonging to the first security officer, thereby authorizing the quote maker to perform the trade;
    if the quote is to be accepted, accepting the quote by,
        signing the quote with a private key belonging to a quote receiver, and
        communicating a trade record including the signed quote to the quote maker;
    wherein the quote maker and the first security officer are separate entities;
    whereby requiring signatures from both the quote maker and the first security officer prevents perpetration of fraud by a single entity.

20. The computer-readable storage medium of claim 19, wherein the method further comprises validating the identity of the quote maker by using a public key of a certification authority to verify that a certificate containing the public key of the quote maker was signed by a corresponding private key belonging to the certification authority,
    wherein the signing by the certification authority indicates that the certification authority has verified the identity of the quote maker.

21. The computer-readable storage medium of claim 20, wherein the quote includes multiple quotes from multiple quote makers, and wherein the multiple quotes have been aggregated by a trade facilitator.

22. The computer-readable storage medium of claim 21, wherein communicating the trade record to the quote maker involves:
    sending the trade record to the trade facilitator; and
    allowing the trade facilitator to send the trade record to the quote maker.

23. The computer-readable storage medium of claim 19, wherein the method further comprises:
    prior to receiving the quote at the first computer system, communicating a quote request from the quote receiver on the first computer system to the quote maker;
    allowing the quote maker to validate the identity of the quote receiver;
    allowing the quote maker to validate that the quote receiver has permission to perform the trade by using a public key of a second security officer associated with the quote receiver to verify that permission information within the quote request was signed by a corresponding private key belonging to the second security officer, thereby authorizing the quote receiver to perform the trade.

24. The computer-readable storage medium of claim 19, wherein accepting the quote further comprises sending the trade record to a settlement clerk associated with the quote receiver who is responsible for settling the trade.

25. The computer-readable storage medium of claim 19, wherein prior to receiving the quote, the method further comprises allowing the quote maker to obtain permission to make the trade by:
    sending a request for permission to the first security officer associated with the quote maker;
    allowing the first security officer to digitally sign a permission record to indicate the quote maker has permission to trade.

26. The computer-readable storage medium of claim 19, wherein the trade involves foreign exchange and wherein the trade record includes:
    a trade date;
    an identifier for a first currency;
    a first currency amount;
    an identifier for a first organization providing the first currency;
    an identifier for a second currency;
    a second currency amount; and
    an identifier for a second organization providing the second currency.

27. A computer-readable storage medium storing instructions that when executed by a computer cause the computer to perform a method for using digital signatures in performing validations to facilitate a trade, the method comprising:
    receiving a trade record from a quote receiver who has accepted a quote and has thereby created the trade, wherein the trade record is signed by the quote receiver;
    wherein the trade record is received by a first settlement clerk associated with the quote receiver, who is responsible for settling the trade;
    augmenting the trade record with settlement instructions identifying at least one account to be used in settling the trade;
    signing the trade record with a private key belonging to the first settlement clerk;
    communicating the trade record to a second settlement clerk associated with a quote maker;
    wherein the quote receiver and the first settlement clerk are separate entities;
    whereby requiring signatures from both the quote receiver and the first settlement clerk prevents perpetration of fraud by a single entity.

28. The computer-readable storage medium of claim 27, wherein the method further comprises:

receiving the trade record at the second settlement clerk;

using a public key belonging to the first settlement clerk to validate that the first settlement clerk has signed to trade record;

validating that the first settlement clerk has been granted permission to settle the trade by examining permission information contained within the trade record to verify that a first security officer associated with the first settlement clerk has digitally signed the permission information in order to authorize the first settlement clerk to settle the trade; and communicating the trade to a funds transfer agent to carry out the trade.

29. The computer-readable storage medium of claim 27, wherein communicating the trade record to the second settlement clerk involves:

sending the trade record to a trade facilitator;

allowing the trade facilitator to augment the trade record with the permission information for the first settlement clerk; and allowing the trade facilitator to forward the trade record to the second settlement clerk.

30. The computer-readable storage medium of claim 27, wherein the trade involves foreign exchange and wherein the trade record includes:

a trade date;

an identifier for a first currency;

a first currency amount;

an identifier for a first organization providing the first currency;

an identifier for a second currency;

a second currency amount; and an identifier for a second organization providing the second currency.

31. The computer-readable storage medium of claim 30, wherein the settlement instructions include:

an identifier for a first account belonging to the first organization; and an identifier for a second account belonging to the second organization.

32. A computer-readable storage medium storing instructions that when executed by a computer cause the computer to perform a method for using digital signatures in performing validations to facilitate a trade, the method comprising:

receiving a quote request from a quote requester at a computer system belonging to a trade facilitator, wherein the quote request has been signed by a quote requester and a first security officer;

looking up a trading permission for the quote requester from a database maintained by the trade facilitator;

appending the trading permission to the quote request to form a trade record;

communicating the trade record to potential quoting entities;

receiving quotes from the potential quoting entities;

augmenting the trade record to include the quotes; and sending the augmented trade record to the quote requester;

wherein the quote requester and the first security officer are separate entities;

whereby requiring signatures from both the quote requester and the first security officer prevents perpetration of fraud by a single entity.

33. The computer-readable storage medium of claim 32, wherein the method further comprises:

receiving a selection of a quote from the quote requester; and notifying each of the quoting entities about whether the quote they made was selected.

34. The computer-readable storage medium of claim 33, wherein the method further comprises:

receiving the trade record from a first settlement clerk associated with the quote requester;

wherein the trade record includes settlement instructions appended to the trade record by the first settlement clerk;

looking up permission information for the first settlement clerk in a database;

augmenting the trade record with the permission information for the first settlement clerk; and forwarding the trade record to a second settlement clerk associated with a quote maker;

whereby the second settlement clerk can validate the permission information by verifying that the permission information was signed with a private key belonging to a first security officer associated with the first settlement clerk, thereby authorizing the first settlement clerk to settle the trade.

35. The computer-readable storage medium of claim 34, wherein the trade involves foreign exchange and wherein the trade record includes:

a trade date;

an identifier for a first currency;

a first currency amount;

an identifier for a first organization providing the first currency;

an identifier for a second currency;

a second currency amount; and an identifier for a second organization providing the second currency.

36. The computer-readable storage medium of claim 35, wherein the settlement instructions include:

an identifier for a first account belonging to the first organization; and an identifier for a second account belonging to the second organization.

37. An apparatus that uses digital signatures in performing validations to facilitate a trade, comprising:

a receiving mechanism that is configured to receive a quote related to the trade at a first computer system;

wherein the quote includes permission information that facilitates determining permissions that have been granted to a quote maker who is making the quote;

a validation mechanism that is configured to validate that the quote maker digitally signed the quote by using a public key of the quote maker to verify that the quote was signed by a corresponding private key belonging to the quote maker;

wherein the validation mechanism is further configured to validate that the quote maker has permission to perform the trade by using a public key of a first security officer to verify that the permission information was signed by a corresponding private key belonging to the first security officer, thereby authorizing the quote maker to perform the trade;

a quote accepting mechanism, wherein if the quote is to be accepted, the quote accepting mechanism is configured to, sign the quote with a private key belonging to a quote receiver, and to communicate a trade record including the signed quote to the quote maker;

wherein the quote maker and the first security officer are separate entities;

whereby requiring signatures from both the quote maker and the first security officer prevents perpetration of fraud by a single entity.

38. The apparatus of claim 37, wherein the validation mechanism is further configured to validate the identity of the quote maker by using a public key of a certification authority to verify that a certificate containing the public key of the quote maker was signed by a corresponding private key belonging to the certification authority, wherein the signing by the certification authority indicates that the certification authority has verified the identity of the quote maker.

39. The apparatus of claim 38, wherein the quote includes multiple quotes from multiple quote makers, and wherein the multiple quotes have been aggregated by a trade facilitator.

40. The apparatus of claim 39, wherein in communicating the trade record to the quote maker, the quote accepting mechanism is configured to:

send the trade record to the trade facilitator so that the trade facilitator can send the trade record to the quote maker.

41. The apparatus of claim 37, further comprising a quote requesting mechanism that is configured to:

communicate a quote request from the quote receiver on the first computer system to the quote maker, so that the quote maker can validate the identity of the quote receiver, and so that the quote maker can validate that the quote receiver has permission to perform the trade by using a public key of a second security officer associated with the quote receiver to verify that permission information within the quote request was signed by a corresponding private key belonging to the second security officer, thereby authorizing the quote receiver to perform the trade.

42. The apparatus of claim 37, wherein the quote accepting mechanism is further configured to send the trade record to a settlement clerk associated with the quote receiver who is responsible for settling the trade.

43. The apparatus of claim 37, further comprising a permission mechanism that is configured to obtain permission for the quote maker to make the trade by:

sending a request for permission to the first security officer associated with the quote maker;

allowing the first security officer to digitally sign a permission record to indicate the quote maker has permission to trade.

44. The apparatus of claim 39, wherein the trade involves foreign exchange and wherein the trade record includes:

a trade date;

an identifier for a first currency;

a first currency amount;

an identifier for a first organization providing the first currency;

an identifier for a second currency;

a second currency amount; and an identifier for a second organization providing the second currency.

45. An apparatus that uses digital signatures in performing validations to facilitate a trade, comprising:

a first receiving mechanism that is configured to receive a trade record from a quote receiver who has accepted a quote and has thereby created the trade, wherein the trade record is signed by the quote receiver;

wherein the trade record is received by a first settlement clerk associated with the quote receiver, who is responsible for settling the trade;

a settlement instruction mechanism that is configured to augment the trade record with settlement instructions identifying at least one account to be used in settling the trade;

a signing mechanism that is configured to sign the trade record with a private key belonging to the first settlement clerk;

a first communication mechanism that is configured to communicate the trade record to a second settlement clerk associated with a quote maker;

wherein the quote receiver and the first settlement clerk are separate entities;

whereby requiring signatures from both the quote receiver and the first settlement clerk prevents perpetration of fraud by a single entity.

46. The apparatus of claim 45, further comprising:

a second receiving mechanism that is configured to receive the trade record for the second settlement clerk;

a validation mechanism for the second settlement clerk that is configured to use a public key belonging to the first settlement clerk to validate that the first settlement clerk has signed to trade record;

wherein the validation mechanism is additionally configured to validate that the first settlement clerk has been granted permission to settle the trade by examining permission information contained within the trade record to verify that a first security officer associated with the first settlement clerk has digitally signed the permission information in order to authorize the first settlement clerk to settle the trade; and a second communication mechanism for the second settlement clerk that is configured to communicate the trade to a funds transfer agent to carry out the trade.

47. The apparatus of claim 46, wherein the first communication mechanism is configured to send the trade record to a trade facilitator, so that the trade facilitator can augment the trade record with the permission information for the first settlement clerk before forwarding the trade record to the second settlement clerk.

48. The apparatus of claim 47, wherein the trade involves foreign exchange and wherein the trade record includes:

a trade date;

an identifier for a first currency;

a first currency amount;

an identifier for a first organization providing the first currency;

an identifier for a second currency;

a second currency amount; and an identifier for a second organization providing the second currency.

49. The apparatus of claim 48, wherein the settlement instructions include:

an identifier for a first account belonging to the first organization; and an identifier for a second account belonging to the second organization.

50. An apparatus that uses digital signatures in performing validations to facilitate a trade, comprising:

a receiving mechanism, within a computer system belonging to a trade facilitator, that is configured to receive a quote request from a quote requester, wherein the quote request has been signed by a quote requester and a first security officer;

a lookup mechanism that is configured to look up a trading permission for the quote requester from a database maintained by the trade facilitator;

an appending mechanism that is configured to append the trading permission to the quote request to form a trade record;

a communication mechanism that is configured to communicate the trade record to potential quoting entities;

wherein the receiving mechanism is additionally configured to receive quotes from the potential quoting entities;

an augmenting mechanism that is configured to augment the trade record to include the quotes; and a sending mechanism that is configured to send the augmented trade record to the quote requester;

wherein the quote requestor and the first security officer are separate entities;

whereby requiring signatures from both the quote requester and the first security officer prevents perpetration of fraud by a single entity.

51. The apparatus of claim 50, wherein the receiving mechanism is additionally configured to receive a selection of a quote from the quote requester, and further comprising a notification mechanism that is configured to notify each of the quoting entities about whether the quote they made was selected.

52. The apparatus of claim 51, wherein the receiving mechanism is additionally configured to receive the trade record from a first settlement clerk associated with the quote requester;

wherein the trade record includes settlement instructions appended to the trade record by the first settlement clerk;

wherein the lookup mechanism is additionally configured to look up permission information for the first settlement clerk in a database;

wherein the augmenting mechanism is additionally configured to augment the trade record with the permission information for the first settlement clerk; and wherein the sending mechanism is additionally configured to forward the trade record to a second settlement clerk associated with a quote maker;

whereby the second settlement clerk can validate the permission information by verifying that the permission information was signed with a private key belonging to a first security officer associated with the first settlement clerk, thereby authorizing the first settlement clerk to settle the trade.

53. The apparatus of claim 52, wherein the trade involves foreign exchange and wherein the trade record includes:

a trade date;

an identifier for a first currency;

a first currency amount;

an identifier for a first organization providing the first currency;

an identifier for a second currency;

a second currency amount; and an identifier for a second organization providing the second currency.

54. The apparatus of claim 53, wherein the settlement instructions include:

an identifier for a first account belonging to the first organization; and an identifier for a second account belonging to the second organization.

* * * * *